(12) United States Patent
Lin et al.

(10) Patent No.: US 9,286,540 B2
(45) Date of Patent: Mar. 15, 2016

(54) FAST DENSE PATCH SEARCH AND QUANTIZATION

(71) Applicant: Adobe Systems Incorporated, San Jose, CA (US)

(72) Inventors: Zhe Lin, Fremont, CA (US); Jianchao Yang, San Jose, CA (US); Hailin Jin, San Jose, CA (US); Xin Lu, University Park, PA (US)

(73) Assignee: Adobe Systems Incorporated, San Jose, CA (US)

( * ) Notice: Subject to any disclaimer, the term of this patent is extended or adjusted under 35 U.S.C. 154(b) by 175 days.

(21) Appl. No.: 14/085,488

(22) Filed: Nov. 20, 2013

(65) Prior Publication Data

US 2015/0139557 A1 May 21, 2015

(51) Int. Cl.
*G06K 9/68* (2006.01)
*G06K 9/46* (2006.01)
*G06K 9/62* (2006.01)

(52) U.S. Cl.
CPC ............ *G06K 9/4642* (2013.01); *G06K 9/6273* (2013.01); *G06K 9/6276* (2013.01)

(58) Field of Classification Search
CPC .................................................... G06K 9/6215
USPC .................................. 382/155, 181, 190, 220
See application file for complete search history.

(56) References Cited

U.S. PATENT DOCUMENTS

| | | | |
|---|---|---|---|
| 8,374,457 B1 | 2/2013 | Wang et al. | |
| 8,655,109 B2 | 2/2014 | Lin et al. | |
| 9,189,834 B2 | 11/2015 | Lin et al. | |
| 2003/0161500 A1* | 8/2003 | Blake et al. | 382/103 |
| 2006/0115145 A1* | 6/2006 | Bishop et al. | 382/155 |
| 2007/0177817 A1 | 8/2007 | Szeliski et al. | |
| 2008/0002856 A1* | 1/2008 | Ma et al. | 382/103 |
| 2011/0047163 A1* | 2/2011 | Chechik et al. | 707/741 |
| 2011/0097008 A1 | 4/2011 | Cao et al. | |
| 2012/0219224 A1* | 8/2012 | Ding et al. | 382/195 |
| 2012/0281923 A1 | 11/2012 | Irani et al. | |
| 2013/0034313 A1 | 2/2013 | Lin et al. | |
| 2013/0156340 A1 | 6/2013 | Porikli et al. | |
| 2013/0202177 A1 | 8/2013 | Bar-Aviv et al. | |

(Continued)

OTHER PUBLICATIONS

A.K.Jain et al., "Data Clustering: A Review", ACM Computing Surveys, vol. 31, No. 3, pp. 264-323, Sep. 1999.*

(Continued)

*Primary Examiner* — Samir Ahmed
(74) *Attorney, Agent, or Firm* — Wolfe-SBMC

(57) ABSTRACT

In techniques for fast dense patch search and quantization, partition center patches are determined for partitions of example image patches. Patch groups of an image each include similar image patches and a reference image patch that represents a respective patch group. A partition center patch of the partitions is determined as a nearest neighbor to the reference image patch of a patch group. The partition center patch can be determined based on a single-nearest neighbor (1-NN) distance determination, and the determined partition center patch is allocated as the nearest neighbor to the similar image patches in the patch group. Alternatively, a group of nearby partition center patches are determined as the nearest neighbors to the reference image patch based on a k-nearest neighbor (k-NN) distance determination, and the nearest neighbor to each of the similar image patches in the patch group is determined from the nearby partition center patches.

20 Claims, 7 Drawing Sheets

(56) References Cited

U.S. PATENT DOCUMENTS

| | | |
|---|---|---|
| 2014/0119664 A1 | 5/2014 | Ioffe et al. |
| 2014/0219552 A1 | 8/2014 | Porikli et al. |
| 2014/0301661 A1 | 10/2014 | Voronov et al. |
| 2015/0036943 A1 | 2/2015 | Lin |
| 2015/0110386 A1 | 4/2015 | Lin et al. |
| 2015/0131915 A1 | 5/2015 | Lin et al. |
| 2015/0332438 A1 | 11/2015 | Lin et al. |

OTHER PUBLICATIONS

Michael Elad et al., "Image Denoising Via Sparse and Redundant Representations Over Learned Dictionaries", IEEE Transactions on Image Processing, vol. 15, No. 12, pp. 3736-3745, Dec. 2006.*

Neha Soni et al., "Categorization of Several Clustering Algorithms from Different Perspective: A Review", International Journal of Advanced Research in Computer Science and Software Engineering, vol. 2, Issue 8, pp. 63-68, Aug. 20012.*

Buades et al., 2005 Society for Industrial and Applied Mathematics, 2005, pp. 490-530.

Mosseri et al., "Combining the Power of Internal and External Denoising", In ICCP—retrieved at <<http://www.wisdom.weizmann.ac.il/~mariazon/papers/Mosseri_Zontak_Irani_ICCP2013.pdf>>, 2013, 9 pages.

Dabov et al., "Image denoising by sparse 3D transform-domain collaborative filtering", IEEE Transactions on Image Processing, vol. 16, No. 8, Aug. 2007, 16 pages.

Burger et al., "Image denoising: Can plain Neural Networks compete with BM3D", In CVPR—retrieved at <<http://www.is.tuebingen.mpg.de/fileadmin/user_upload/files/publications/2012/CVPR-2012-Burger.pdf>>, 2012, 8 pages.

"Pre-Interview Communication", U.S. Appl. No. 14/080,659, Jun. 5, 2015, 4 pages.

"Notice of Allowance", U.S. Appl. No. 14/080,659, Aug. 11, 2015, 7 pages.

"Restriction Requirement", U.S. Appl. No. 14/280,421, Nov. 19, 2015, 6 pages.

* cited by examiner

FAST DENSE PATCH SEARCH AND QUANTIZATION

BACKGROUND

Digital image patch searching and matching, such as when matching patches between digital images, or between regions of the images, is also referred to as computing a nearest neighbor field and is a common technique used for image processing and computer graphics applications. Patches of an image may be compared as each pixel of the image, or patches may be a larger region of the image that includes a grid of multiple pixels. Patch matching can be time-consuming and processor intensive to search for a corresponding nearest neighbor database patch for every overlapping patch in an image, such as when comparing hundreds of thousands of image patches from an image to millions of external database image patches for nearest neighbor distance determinations. Some techniques leverage an approximate nearest neighbor search, such as on partition center patches of partitions of similar patches, in an effort to improve processor efficiency. However, even an approximate nearest neighbor search can be slow and processor intensive when attempting to search and match every image patch from an image to the external database patches.

SUMMARY

This Summary introduces features and concepts of fast dense patch search and quantization, which is further described below in the Detailed Description and/or shown in the Figures. This Summary should not be considered to describe essential features of the claimed subject matter, nor used to determine or limit the scope of the claimed subject matter.

Fast dense patch search and quantization is described. In embodiments, example image patches taken from external, example images are grouped into partitions of example image patches, and a partition center patch is determined for each of the partitions. In implementations, each of the example image patches can represent one of the partitions and is the partition center patch for its respective partition. Alternatively, the partitions are clusters of example image patches and the partition center patch of a respective partition is an average of the example image patches in the partition.

In embodiments, patch groups of an image are formed that each include similar image patches and a reference image patch that represents the similar image patches in each of the patch groups. The patch groups of the similar image patches in the image can be formed by sampling the image patches of the image, determining the similar image patches based on computed distances between the image patches, and then grouping the similar image patches into one of the patch groups based on the computed distances between the similar image patches being less than a distance threshold. Additionally, the reference image patch for each of the patch groups can be randomly selected from the similar image patches in each of the respective patch groups.

In embodiments, a partition center patch of the partitions is determined as a nearest neighbor to the reference image patch of a patch group. The partition center patch can be determined based on a single-nearest neighbor (1-NN) distance determination, and the determined partition center patch can be allocated as the nearest neighbor to all of the similar image patches in the patch group that is represented by the reference image patch. Alternatively, a group of nearby partition center patches can be determined as the nearest neighbors to the reference image patch based on a k-nearest neighbor (k-NN) distance determination, and the nearest neighbor to each of the similar image patches in the patch group is determined from the group of nearby partition center patches.

BRIEF DESCRIPTION OF THE DRAWINGS

Embodiments of fast dense patch search and quantization are described with reference to the following Figures. The same numbers may be used throughout to reference like features and components that are shown in the Figures.

DETAILED DESCRIPTION

Embodiments of fast dense patch search and quantization are described as a technique to approximate nearest neighbor patches from example images for image patches of a test image. As noted, it can be time-consuming and processor intensive to search for a corresponding nearest neighbor database patch for every image patch in an image, and to accelerate the process, a patch search application implements the fast dense patch search technique that leverages the spatial prior.

Initially, example image patches taken from external, example images can be grouped into partitions of similar example image patches, and a partition center patch is determined for each of the partitions. In implementations, each of the example image patches from the example images can represent one of the partitions and is the partition center patch for its respective partition. Alternatively, the partitions are clusters of similar example image patches and the partition center patch of a respective partition is an average and representative of the similar example image patches in the partition.

For an image, such as a test image or noisy image, the patch search application forms patch groups of similar image patches of the image, and determines a reference image patch for each group, where the reference image patch represents the similar image patches in a group. In embodiments, the patch search application determines a partition center patch (from the example image patches) that is a nearest neighbor to the reference image patch (for a patch group of similar image patches). The partition center patch can be determined based on a single-nearest neighbor (1-NN) distance determination, and the determined partition center patch can then be allocated as the nearest neighbor to the other similar image patches of the patch group that is represented by the reference image patch. Alternatively, a group of nearby partition center patches can be determined as the nearest neighbors to the reference image patch based on a k-nearest neighbor (k-NN) distance determination, and the nearest neighbor to each of the similar image patches in the patch group is determined from the group of nearby partition center patches.

While features and concepts of fast dense patch search and quantization can be implemented in any number of different devices, systems, networks, environments, and/or configurations, embodiments of fast dense patch search and quantization are described in the context of the following example devices, systems, and methods.

Figure 1:
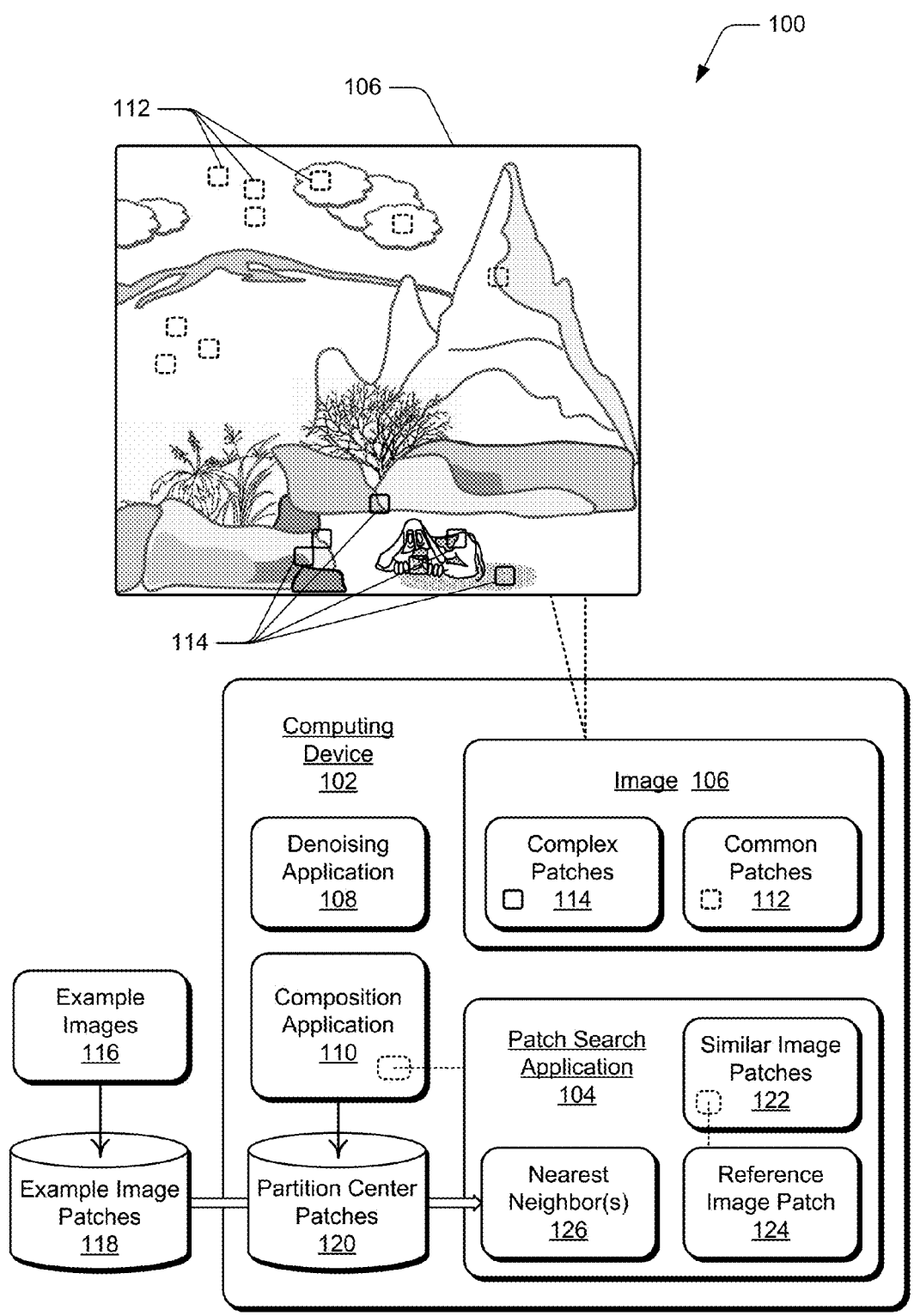
FIG. 1 illustrates an example of a device that implements a patch search application in accordance with one or more embodiments of fast dense patch search and quantization.

FIG. 1 illustrates an example 100 of a computing device 102 that implements a patch search application 104 that approximates nearest neighbor patches from example images for image patches of an image 106 in embodiments of fast dense patch search and quantization. The image 106 can be any type of a digital image, which can be displayed on a display device of a computing system or device. The image 106 can be displayed on any type of display device that is connected to, or integrated with, the computing device 102, such as any type of computer, mobile phone, tablet device, digital camera, or any other electronic media device that implements the patch search application 104 (e.g., a software application) in embodiments of fast dense patch search and quantization. In an implementation, the computing device 102 can also implement a denoising application 108 to denoise the image 106, such as if the image includes noise or is a noisy image.

In implementations, the patch search application 104 and the denoising application 108 may be modules or software components of a composition application 110 (e.g., a software application) that may implement various digital image editing, processing, and composition techniques, such as related to image composition and editing, illustration editing, graphic design, and other types of image composition applications. Similarly, the patch search application 104 and the denoising application 108 can each be implemented as a software application, such as executable software instructions (e.g., computer-executable instructions) that are executable by a processing system of the computing device 102 and stored on a computer-readable storage memory of the device. The computing device can be implemented with various components, such as a processing system and memory, and with any number and combination of differing components as further described with reference to the example device shown in FIG. 7.

The image 106 includes varying features, objects, and regions of the image. A digital image may include noise (e.g., electronic noise or corruption), such as may be introduced into the image by the electronics and/or sensor of a digital camera that is used to capture the image. Another common cause of image noise is when an image is captured in low light. Much like a grainy photograph taken with a conventional camera in a low light environment, noise can appear as random specks in a digital image that has been captured with a digital camera in a low light environment. Noise may also be introduced into a digital image during image processing, such as when a compression technique is applied. The effect of noise may appear as a noticeable mark or imperfection in an image, or may appear to blur most of an image.

In this example 100, the image 106 includes common patches 112 denoted by the dashed-line patches, and complex patches 114 denoted by the solid-line patches. The common patches 112 are patches of image content that recur in multiple example images 116 and/or recur in the noisy image 106 itself. For example, the common patches 112 of the clouds, sky, and background region in the image 106 are likely to be found in many other external images, as well as recurring in the image itself. The common patches 112 may be noisy image patches of the image that recur as example image patches 118 in the multiple example images. The complex patches 114 are patches of image content that are unique to the image, or may recur only infrequently in the external, example images. For example, the complex patches 114 of the rock formations, the shadows, and features of the dog are not likely to be found in other external images, and are unique to the image. The complex patches 114 that are unique to the image 106 may be noisy image patches of the image that generally do not recur in the multiple example images.

In embodiments, the denoising application 108 is implemented to determine the common patches 112 and the complex patches 114 of the image 106, such as based on partitions of the example image patches 118, and partition center patches 120 of the partitions, as determined by the composition application 110. As described with reference to FIG. 2, the composition application 110 generates partitions of similar example image patches 118, from which the partition center patches 120 are determined. As described with reference to FIG. 4, the denoising application 108 can denoise the common patches 112 of the image 106 with denoising operators that are developed from the example image patches 118, and denoise the complex patches 114 of the image with internal denoising techniques. As noted, however, it can be time-consuming and/or processor intensive to search for a corresponding nearest neighbor database patch for every common patch in the image 106 to denoise the common patches of the image. To accelerate the process, the patch search application 104 implements the fast dense patch search technique that leverages the spatial prior.

As described with reference to FIG. 3, the patch search application 104 is implemented to form patch groups locally with similar common patches 112 that are more likely to exist in nearby positions in the image 106. In embodiments, the patch search application 104 can form patch groups of similar image patches 122 of the image 106, as well as a reference image patch 124 of each patch group that represents the similar image patches in a respective patch group. The patch search application 104 is implemented to determine a partition center patch 120 of the partitions that is a nearest neighbor 126 to a reference image patch 124 of a patch group. The partition center patch can be determined based on a single-nearest neighbor (1-NN) distance determination, and the determined partition center patch can be allocated as the nearest neighbor 126 to all of the similar image patches 122 in the patch group that is represented by the reference image patch. Alternatively, a group of the nearby partition center patches 120 can be determined as the nearest neighbors 126 to the reference image patch 124 based on a k-nearest neighbor (k-NN) distance determination, and the nearest neighbor to each of the similar image patches in a patch group is determined from the group of nearby partition center patches.

Figure 2:
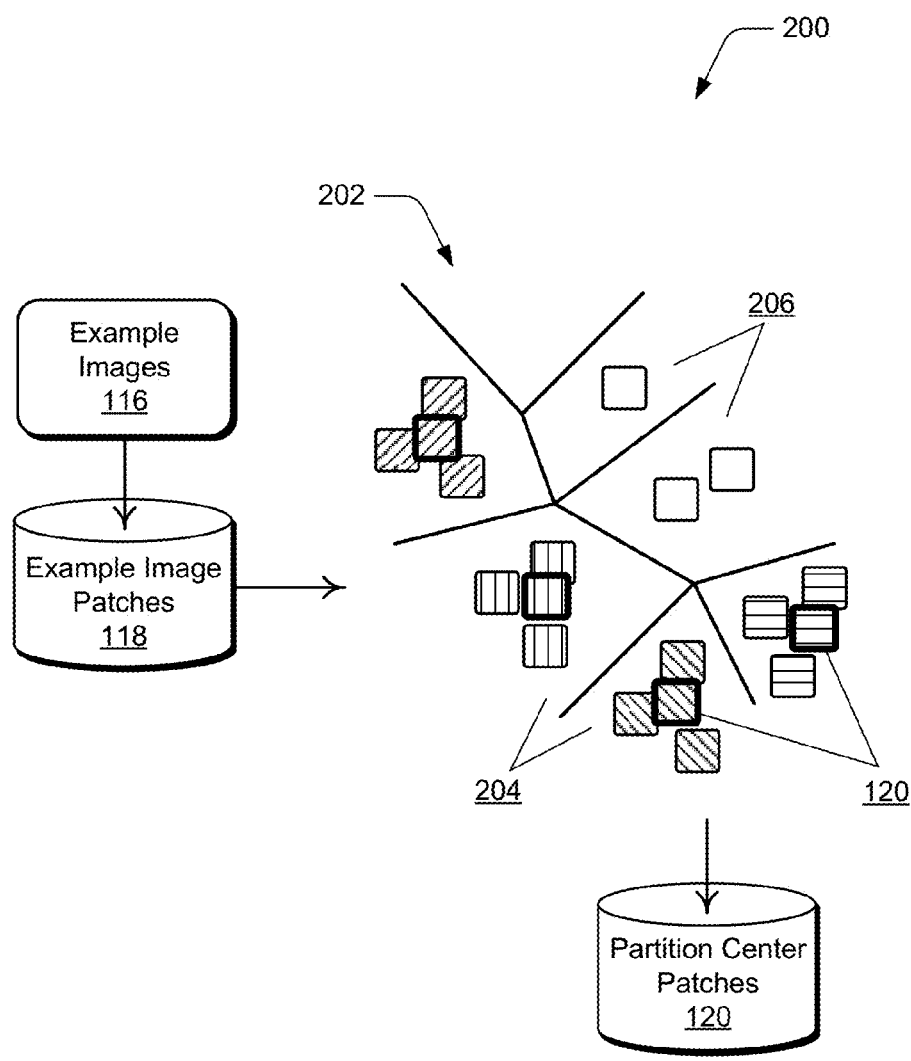
FIG. 2 illustrates an example of developing partitions and partition center patches from an example images database in accordance with one or more embodiments of fast dense patch search and quantization.

FIG. 2 illustrates an example 200 described with reference to the composition application 110 that is implemented by the computing device 102 shown in FIG. 1. The composition application 110 is implemented to group the example image patches 118 taken from the example images 116 into partitions 202 of similar example image patches. For example, millions of clean patches (e.g., external sample patches that are free from noise) can be sampled from the multiple example images 116, and the composition application 110 can generate the partitions 202 of the similar example image patches 118 from the example images, which are external to the image 106 that is to be denoised. The example image patches 118 are shown with different patch fill designs, such as the example image patches in the representative partitions 204. In practice, the partitions 202 of the example image patches would typically be represented as groupings of colored patches that are sectioned by the partitions. However, and merely for illustrative purposes in this example 200, the different colors of partitioned example image patches are represented by the different patch fill designs of the example image patches. In implementations, the example image patches 118 can be partitioned into the groups or clusters based on any descriptors and/or features of the example image patches.

The composition application 110 can partition a large set of the example image patches 118, such as utilizing a hierarchical k-means technique to develop the partitions 202. Additionally, the partitioning may be performed on mean-extracted patches to reduce patch complexity. In one or more implementations, relatively small patch sizes (e.g., 5×5) are used with fine-grained partitions (e.g., approximately 100,000 to 1,000,000 partitions) to ensure the patch space is sufficiently represented by a set of partition centers. The composition application 110 is also implemented to determine a partition center patch 120 for each of the partitions 202, where a partition center patch is an average and representative of the similar example image patches 118 in a respective partition. In this example 200, the partition center patches 120 are represented as the darker, bolded-line patches in each of the partitions, such as in the representative partitions 204, and a database of the partition center patches 120 is generated and maintained.

In implementations, the composition application 110 can sample the noise-free example images 116 to determine the example image patches 118. For example, the patches 118 may be randomly sampled from the collection of example images having little to no noise, which results in the collection of noise-free example image patches $\{X_i\}_{i=1}^{N}$, where "N" is the total number of sampled patches and $\{X_i\}_{i=1}^{N}$ are zero-mean patches (i.e., the sum of vector elements equals to one (1)). The composition application 110 can then form the partitions 202 that include respective subsets of the example image patches 118. For example, a large set of the partitions 202 may be used to capture variation of the example image patches taken from the example images, and each of the partitions represents a unique structure with low variance. A hierarchical k-means clustering algorithm may be used by the composition application 110 to partition the input patch space that includes the example image patches 118.

The composition application 110 can also be implemented to reduce the quantity of the partitions 202 by removing the partitions that have a lesser number of example image patches. For example, the partitions 206 have a small number of example image patches 118, and the partitions are removed (e.g., pruned or trimmed) from the overall partitions 202. In implementations, the partitions 206 with the fewest number of patches can be removed, or alternatively, the partitions 206 can be removed based on a threshold minimum number of example image patches that are grouped into a partition.

Figure 3:
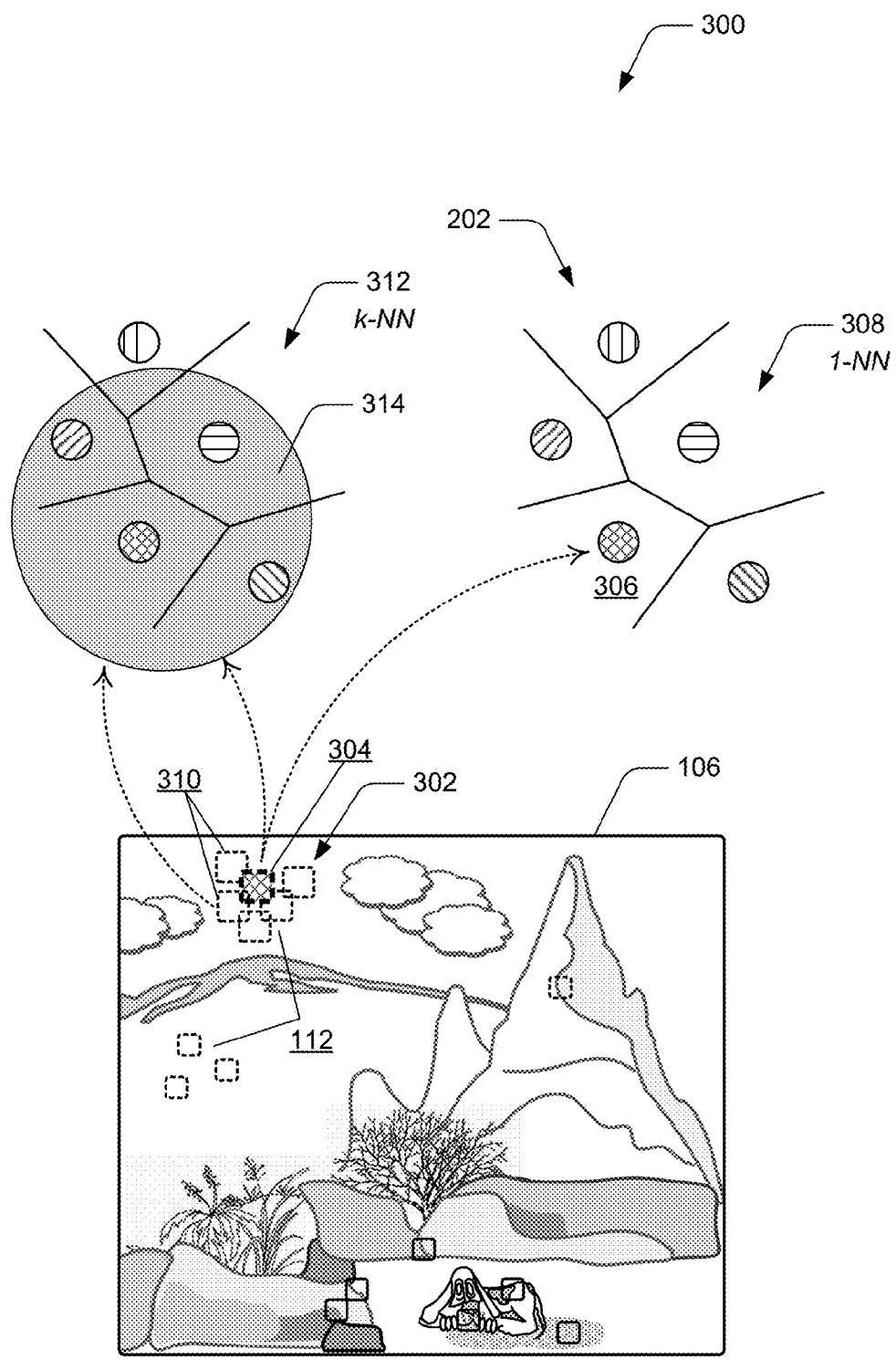
FIG. 3 illustrates example implementations of fast dense patch searches in accordance with one or more embodiments.

FIG. 3 illustrates an example 300 described with reference to the patch search application 104 that is implemented by the computing device 102, and the patch search application implements the fast dense patch search technique that leverages the spatial prior. A group of the common patches 112 of the image 106 are shown as a patch group 302 of similar image patches, such as would likely be the case for image patches of the sky and/or background in the image. In implementations of the fast dense patch search, it can be assumed that the locally similar patches of the patch group 302 share a partition or nearby partitions (e.g., partitions 202 of common, similar image patches).

Given the image 106 (e.g., a noisy image, or test image), the patch search application 104 is implemented to form similar patch groups locally with the similar image patches 122 that are more likely to exist in nearby positions in natural images, such as the patch group 302 of similar image patches. The image patches can be original patches, or can be mean-subtracted image patches. Then for each patch group 302, the patch search application 104 selects a reference image patch 304 that represents the similar image patches, and searches for the nearest neighbor 126 (e.g., a partition center patch 120) to the one reference image patch for the patch group of similar image patches.

In an embodiment, the patch search application 104 can determine a partition center patch 306 from the partitions 202 that is a nearest neighbor to the reference image patch 304 based on a single-nearest neighbor (1-NN) distance determination, as shown at 308. The patch search application 104 can then allocate the determined partition center patch 306 as the nearest neighbor to the other similar image patches 310 in the patch group 302 of similar image patches. Alternatively, the nearest neighbors to the other similar image patches 310 in the patch group 302 can be determined based on a k-nearest neighbor (k-NN) distance determination, as shown at 312. The nearest neighbor to each of the similar image patches 310 can be determined from the group 314 of nearby partition center patches, and as shown in the example, any one of the four partition center patches may be determined as the nearest neighbor to one of the similar image patches 310 in the patch group 302.

In another embodiment, the patch search application 104 can determine the group 314 of the nearby partition center patches as the nearest neighbors to the reference image patch based on the k-nearest neighbor (k-NN) distance determination, and the nearest neighbor to each of the similar image patches 310 is also determined from the group of nearby partition center patches. For the similar image patches 310 in the patch group 302, the patch search application 104 can exhaustively scan for the closest nearest neighbor patch inside the group of nearby partition center patches as a refinement based on exhaustive distance computation, or via other more sophisticated distance measure techniques, such as correlation, normalized distance, etc.

In embodiments, the patch search application 104 performs the fast dense patch search, and is implemented to first compute the nearest neighbor distances between any two of the image patches, in a local neighborhood or in the entire image 106, using a fast method, such as PCA (principal component analysis) or integral image. After the distances between two of the image patches are computed, the patch search application can perform the patch search algorithmically, and in different ways. In a first implementation, the patch search application 104 initially sparsely samples locations in the image 106 and performs a full, approximate nearest neighbor search method to find the similar image patches 122. The patch search application can then iterate over all of the image patches performing the nearest neighbor-based center assignment process if the current image patch is close enough to at least one similar image patch that is already assigned to a group of similar image patches, and if not, initiates the approximate nearest neighbor technique to find one.

A second implementation is based on the distances between the image patches, and the patch search application 104 is implemented to form the patch groups using one or more clustering methods, such as agglomerative clustering, k-means clustering, or a greedy method. For any image patch in a group of similar image patches, the patch search application can determine a different image patch so that the distance between the two image patches is within a small bound or threshold. The patch search application can then randomly select an image patch in each patch group 302 as the reference image patch 304. The patch search application 104 is also implemented to scan the image 106 in a raster scanning order of the image, and assign each image patch to a group of similar image patches based on the approximate nearest neighbor method if there are no close neighbors, or assign an image patch based on a similar image patch if there is at least one similar neighbor, as based on the assignment algorithm.

Example method 400 is described with reference to FIG. 4 in accordance with one or more embodiments of fast dense patch search and quantization. Generally, any of the services, components, modules, methods, and operations described herein can be implemented using software, firmware, hardware (e.g., fixed logic circuitry), manual processing, or any combination thereof. The example method may be described in the general context of executable instructions stored on a computer-readable storage memory that is local and/or remote to a computer processing system, and implementations can include software applications, programs, functions, and the like.

Figure 4:
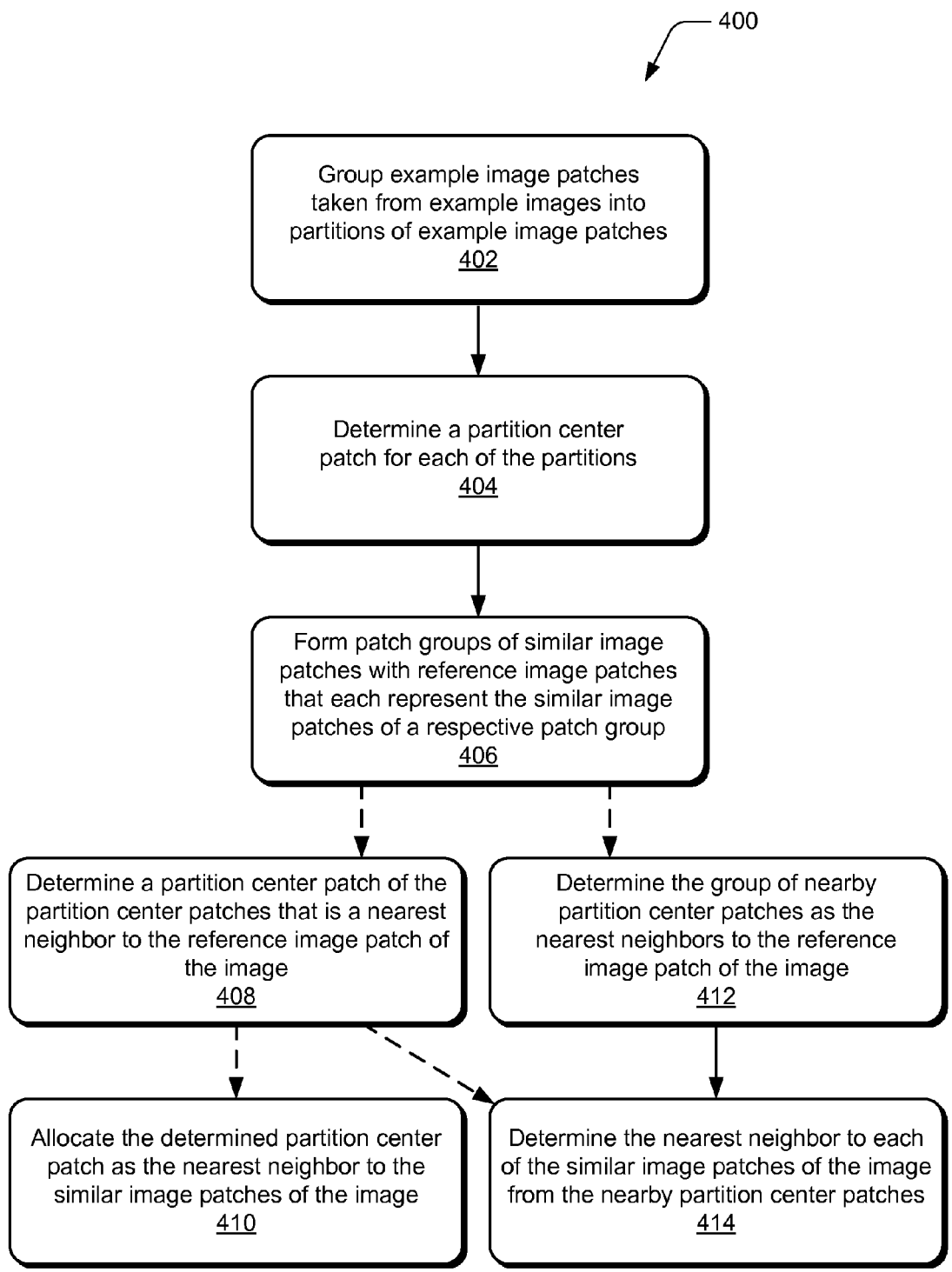
FIG. 4 illustrates example method(s) of fast dense patch search and quantization in accordance with one or more embodiments.

FIG. 4 illustrates example method(s) 400 of fast dense patch search and quantization, and is generally described with reference to a patch search application implemented by a computing device. The order in which the method is described is not intended to be construed as a limitation, and any number or combination of the method operations can be combined in any order to implement a method, or an alternate method.

At 402, example image patches taken from example images are grouped into partitions of example image patches. For example, the composition application 110 (FIG. 1) that is implemented by the computing device 102 (or implemented at a cloud-based data service as described with reference to FIG. 6) groups the example image patches 118 that are taken from the example images 116 into the partitions 202 of example image patches. Each of the example image patches can be a partition itself. Alternatively, the partitions are clusters of the example image patches taken from the example images.

At 404, a partition center patch is determined for each of the partitions, where a partition center patch is representative of the example image patches in a respective partition. For example, the composition application 110 determines the partition center patches 120 for each of the partitions 202. For each of the example image patches that represent one of the partitions, an example image patch is the partition center patch for its respective partition. Alternatively, for the partitions that are clusters of example image patches, the partition center patch of a respective partition is an average of the example image patches in the partition, and the partition center patch 120 is representative of the similar example image patches 118 in a respective partition.

At 406, similar image patches of an image are formed in patch groups, and reference image patches that each represent the similar image patches in a respective patch group are determined. For example, the patch search application 104 (FIG. 1) that is implemented by the computing device 102 (or implemented at a cloud-based data service as described with reference to FIG. 6) forms patch groups of the similar image patches 122 from the image 106, and determines a reference image patch 124 for each patch group of the similar image patches. In implementations, the patch search application 104 samples the image patches of the image 106, determines the similar image patches based on computed distances between the image patches, and forms the patch groups of the similar image patches 122 based on the computed distances between the similar image patches being less than a distance threshold. Additionally, the patch search application 104 randomly selects the reference image patch 124 for each of the patch groups from the similar image patches in each of the respective patch groups.

At 408, a partition center patch of the partitions that is a nearest neighbor to the reference image patch of the image is determined and, at 410, the determined partition center patch is allocated as the nearest neighbor to the similar image patches of the image. For example, the patch search application 104 determines the partition center patch 306 from the partitions 202 that is a nearest neighbor to the reference image patch 304 based on a single-nearest neighbor (1-NN) distance determination, as shown at 308 (FIG. 3). The patch search application 104 then allocates the determined partition center patch 306 as the nearest neighbor to the other similar image patches 310 in the patch group 302 of similar image patches. For example, the patch search application 104 scans the image patches of the image 106 in a raster scanning order, and for each reference image patch and corresponding determined partition center patch, assigns an index of the determined partition center patch to each of the similar image patches in the patch group represented by the reference image patch.

Alternatively, at 412, a group of nearby partition center patches are determined as the nearest neighbors to the reference image patch of the image. For example, the partition center patch is included in the group 314 of nearby partition center patches 120, and the patch search application 104 determines the group 314 of the nearby partition center patches as the nearest neighbors to the reference image patch 304 based on a k-nearest neighbor (k-NN) distance determination.

At 414, the nearest neighbor to each of the similar image patches of the image are determined from the nearby partition center patches. For example, the patch search application 104 determines the nearest neighbor to each of the similar image patches 310 from the group 314 of the nearby partition center patches based on a k-nearest neighbor (k-NN) distance determination. Additionally, as an alternative to allocating the determined partition center patch 306 (determined based on a single-nearest neighbor (1-NN) distance determination) as the nearest neighbor to the other similar image patches 310 in the patch group 302 of similar image patches at 410, the nearest neighbor to each of the similar image patches 310 can be determined from the group 314 of the nearby partition center patches based on the k-nearest neighbor (k-NN) distance determination at 414.

Figure 5:
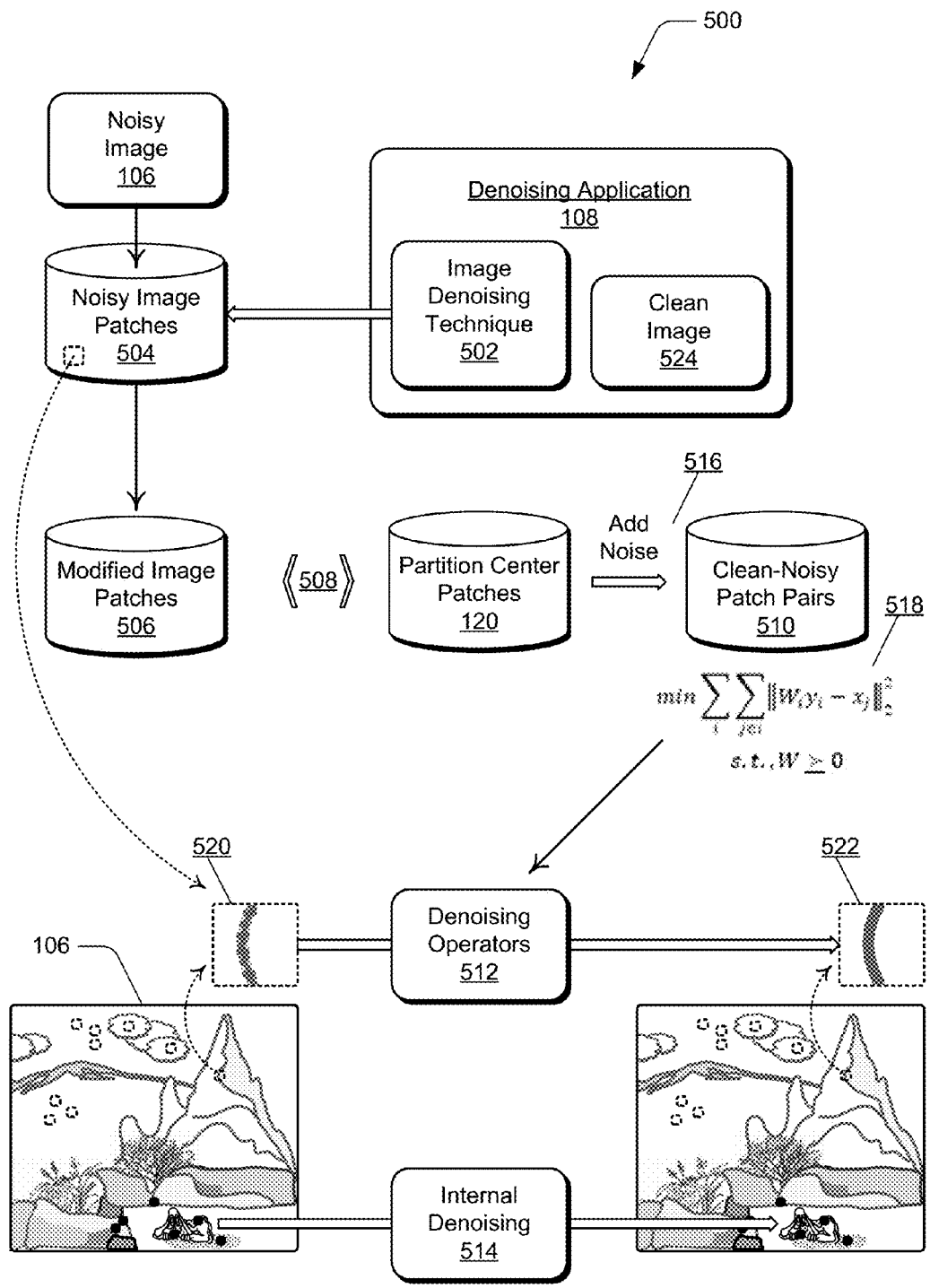
FIG. 5 illustrates an example of denoising image patches of a noisy image and utilizing fast dense patch search techniques in accordance with one or more embodiments.

FIG. 5 illustrates an example 500 of denoising the noisy image patches (e.g., the common patches 112 and the complex patches 114) of the noisy image 106, and utilizing the fast dense patch search technique as described with reference to FIGS. 3 and 4. Given the noisy image 106, the denoising application 108 is implemented to initially apply an image denoising technique 502 to the patches 504 of the noisy image to generate a modified image having modified image patches 506. The denoising application 108 can utilize any type of basic, single image denoising technique, such as non-local means, to initially remove some noise from the image patches 504 of the noisy image 106. Additionally, self-similarity may be used to compute the initial denoising result for the noisy image patches of the noisy image.

The denoising application 108 is implemented to then compare (at 508) each of the modified image patches 506 to the partition center patches 120 to determine a closest partition center patch to a modified image patch. The denoising application 108 can compare a modified image patch 506 to the partition center patches 120 based on a nearest neighbor distance determination to find the nearest neighbor distance between the modified image patch 506 and a partition center patch. In embodiments, the fast dense patch search and quantization technique can be implemented by the patch search application 104 to determine the closest partition center patches to the modified image patches. The denoising application 108 can then classify a noisy image patch 504 of the noisy image 106 that corresponds to a modified image patch 506 as a common patch 112 or as a complex patch 114 of the noisy image.

For example, a noisy image patch 504 that corresponds to a modified image patch 506 can be classified as a common patch 112 of the noisy image 106 based on the nearest neighbor distance of the modified image patch 506 being within a threshold distance of a partition center patch 120. Alternatively, a noisy image patch 504 that corresponds to the modified image patch 506 can be classified as a complex patch 114 of the noisy image 106 based on the nearest neighbor distance of the modified image patch 506 not being within the threshold distance of the partition center patch 120.

The denoising application 108 is also implemented to generate clean-noisy patch pairs 510 from which denoising operators 512 are developed. The denoising application 108 can then denoise the common patches 112 of the noisy image 106 with the denoising operators 512, and denoise the complex patches 114 of the noisy image with internal denoising techniques 514. The denoising application 108 can generate a denoising operator 512 for each of the partitions 202 based on a clean-noisy patch pair 510 that is developed from the partition center patch 120 of a respective partition. For example, the denoising application can add noise at 516 to a partition patch center 120 to generate a corresponding clean-noisy patch pair 510, from which a respective denoising operator 512 is developed.

The denoising application 108 learns the denoising operators 512 on each of the partitions 202 of the example image patches. For each of the partitions 202, the clean partition center patches 120 that are without noise are determined and synthetic noise is added at 516 to generate the clean-noisy patch pairs 510. The denoising application 108 is implemented to then train non-negative linear regressors based on the equation 518 below as the denoising operator for each partition:

$$\min \sum_i \sum_{j \in i} \|W_i y_i - x_j\|_2^2 \text{ s.t., } W > 0$$

where W is the learned denoising operator for each partition 202 based on a "y" noisy patch and predicted "x" output of a clean patch without noise. A denoising operator 512 is a function of a partition center patch 120, and the corresponding denoising operator can be applied to any of the similar image patches in a respective partition 202. The partition center patches 120 and the denoising operators 512 can be saved, and the utilized by the denoising application 108 to denoise the common patches 112 of the noisy image 106.

For a noisy image patch 520, which is one of the noisy image patches 504 and has been classified as a common patch of the image, the denoising application 108 can apply a denoising operator 512 that corresponds to the closest partition center patch 120 to the noisy image patch that is classified as the common patch of the noisy image. The noisy image patch 520 may also be referred to as a noisy common patch of the noisy image 106, and based on the corresponding modified image patch being within the threshold distance of the partition center patch, the denoising application 108 applies the associated denoising operator 512 to generate a denoised-version 522 of the noisy common patch 520. Thus, each of the noisy image patches 504 that are classified as the common patches 112 of the noisy image are denoised with the respective denoising operators 512. The noisy image patches 504 that are classified as the complex patches 114 of the noisy image are denoised with the internal denoising techniques 514, such as using patch average, non-local means, or a similar patch-based method. The entire noisy image 106 can then be reconstructed as a clean image 524 from the denoised common patches and the denoised complex patches by the adaptive denoising technique.

Figure 6:
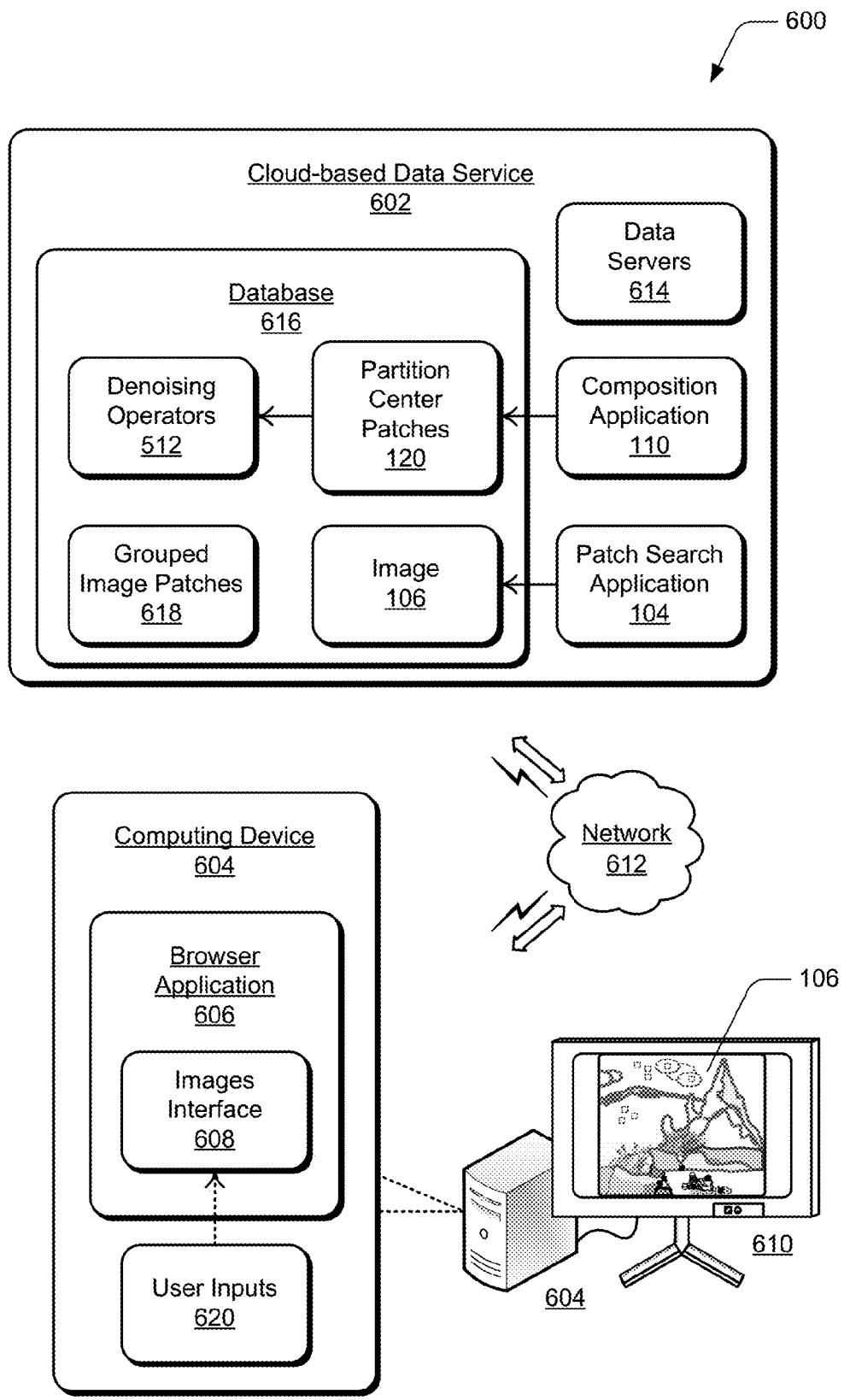
FIG. 6 illustrates an example system in which embodiments of fast dense patch search and quantization can be implemented.

FIG. 6 illustrates an example system 600 in which embodiments of fast dense patch search and quantization can be implemented. The example system 600 includes a cloud-based data service 602 that a user can access via a computing device 604, such as any type of computer, mobile phone, tablet device, and/or other type of computing device. The computing device 604 can be implemented with a browser application 606 through which a user can access the data service 602 and initiate a display of an images interface 608 to display images, such as the image 106 also shown on a display device 610 that is connected to the computing device. The computing device 604 can be implemented with various components, such as a processing system and memory, and with any number and combination of differing components as further described with reference to the example device shown in FIG. 7.

In embodiments of fast dense patch search and quantization, the cloud-based data service 602 is an example of a network service that provides an on-line, Web-based version of the patch search application 104 that a user can log into from the computing device 604 and display the images interface 608. The network service may be utilized for any type of image editing and processing, to include illustration editing, video compositing and editing, graphics and page layouts, animation, and any other type of application user interface. The data service can also maintain and/or upload the image 106 that is displayable in the images interface 608.

Any of the devices, data servers, and networked services described herein can communicate via a network 612, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

The cloud-based data service 602 includes data servers 614 that may be implemented as any suitable memory, memory device, or electronic data storage for network-based data storage, and the data servers communicate data to computing devices via the network 612. The data servers 614 maintain a database 616 of the user images (e.g., the image 106), as well as the grouped image patches 618 that are determined by the patch search application 104. The database 616 can also include the partition center patches 120 and the denoising operators 512 that are generated by the composition application 110 and/or the denoising application 108.

The cloud-based data service 602 can include the patch search application 104, the composition application 110, and/or the denoising application 108, such as software applications (e.g., executable instructions) that are executable with a processing system to implement embodiments of fast dense patch search and quantization. The applications can be stored on a computer-readable storage memory, such as any suitable memory, storage device, or electronic data storage implemented by the data servers 614. Further, the data service 602 can include any server devices and applications, and can be implemented with various components, such as a processing system and memory, as well as with any number and combination of differing components as further described with reference to the example device shown in FIG. 7.

The data service 602 communicates images data and the images interface 608 of the applications to the computing device 604 where the images interface is displayed, such as through the browser application 606 and displayed on the display device 610 of the computing device. The applications can also receive user inputs 620 to the images interface 608, such as when a user at the computing device 604 initiates a user input with a computer input device or as a touch input on a touchscreen to initiate denoising an image. The computing device 604 communicates the user inputs 620 to the data service 602 via the network 612, where the applications receive the user inputs.

Figure 7:
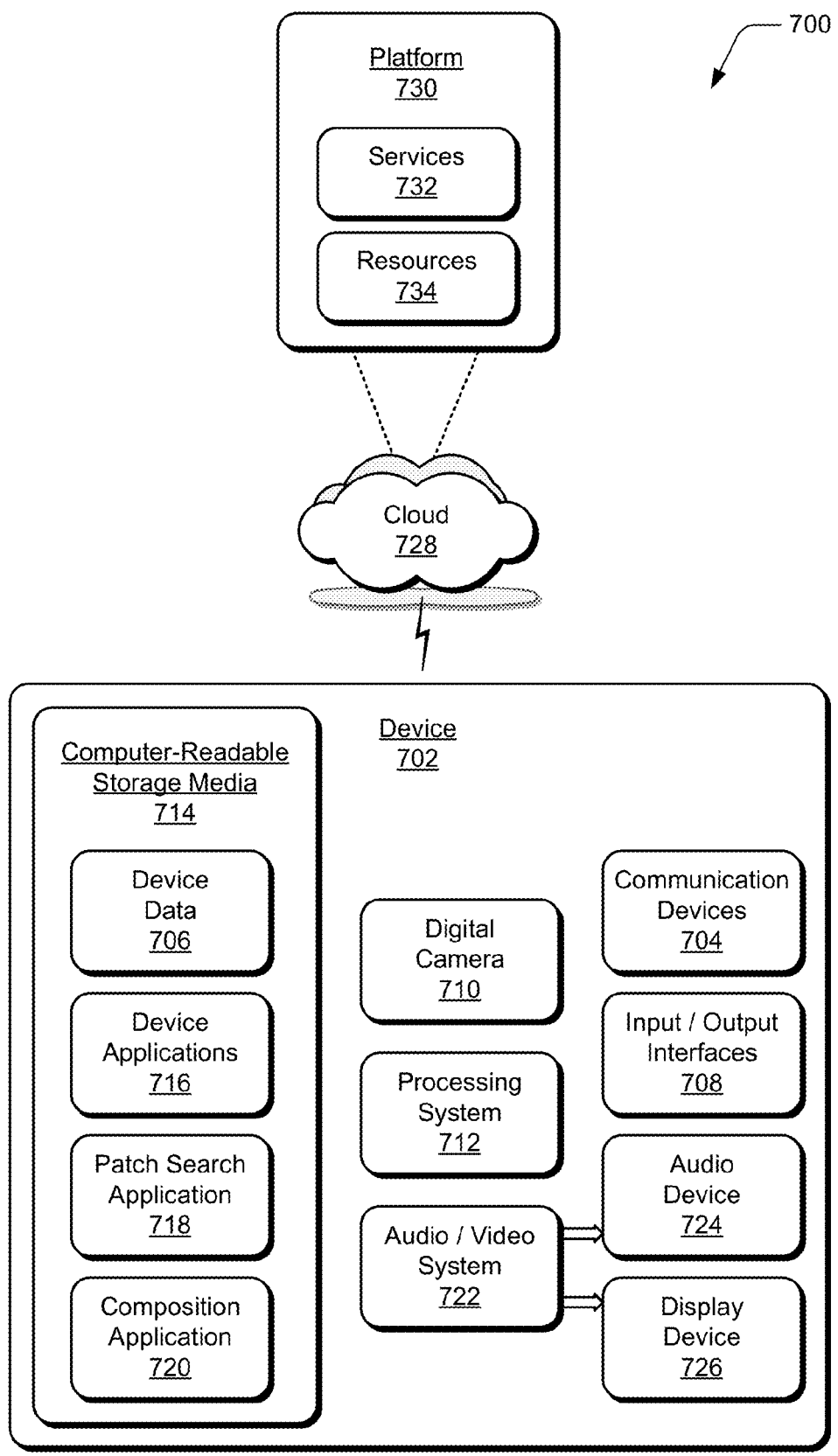
FIG. 7 illustrates an example system with an example device that can implement embodiments of fast dense patch search and quantization.

FIG. 7 illustrates an example system 700 that includes an example device 702, which can implement embodiments of fast dense patch search and quantization. The example device 702 can be implemented as any of the devices and/or server devices described with reference to the previous FIGS. 1-6, such as any type of client device, mobile phone, tablet, computing, communication, entertainment, gaming, media playback, digital camera, and/or other type of device. For example, the computing device 102 shown in FIG. 1, as well as the computing device 604 and the data service 602 (and any devices and data servers of the data service) shown in FIG. 6 may be implemented as the example device 702.

The device 702 includes communication devices 704 that enable wired and/or wireless communication of device data 706, such as user images and other associated image data. The device data can include any type of audio, video, and/or image data, as well as the images and denoised images. The communication devices 704 can also include transceivers for cellular phone communication and/or for network data communication.

The device 702 also includes input/output (I/O) interfaces 708, such as data network interfaces that provide connection and/or communication links between the device, data networks, and other devices. The I/O interfaces can be used to couple the device to any type of components, peripherals, and/or accessory devices, such as a digital camera device 710 and/or display device that may be integrated with the device 702. The I/O interfaces also include data input ports via which any type of data, media content, and/or inputs can be received, such as user inputs to the device, as well as any type of audio, video, and/or image data received from any content and/or data source.

The device 702 includes a processing system 712 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 702 may further include any type of a system bus or other data and command transfer system that couples the various components within the device. A system bus can include any one or combination of different bus structures and architectures, as well as control and data lines.

The device 702 also includes computer-readable storage media 714, such as storage memory and data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

The computer-readable storage media 714 provides storage of the device data 706 and various device applications 716, such as an operating system that is maintained as a software application with the computer-readable storage media and executed by the processing system 712. In this example, the device applications also include a patch search application 718 and/or a composition application 720 that implement embodiments of fast dense patch search and quantization, such as when the example device 702 is implemented as the computing device 102 shown in FIG. 1 or the data service 602 shown in FIG. 6. An example of the patch search application 718 includes the patch search application 104 implemented by the computing device 102 and/or at the data service 602, and an example of the composition application 720 includes the composition application 110 implemented by the computing device 102 and/or at the data service 602, as described in the previous FIGS. 1-6.

The device 702 also includes an audio and/or video system 722 that generates audio data for an audio device 724 and/or generates display data for a display device 726. The audio device and/or the display device include any devices that process, display, and/or otherwise render audio, video, display, and/or image data, such as the image content of a digital photo. In implementations, the audio device and/or the display device are integrated components of the example device 702. Alternatively, the audio device and/or the display device are external, peripheral components to the example device.

In embodiments, at least part of the techniques described for fast dense patch search and quantization may be implemented in a distributed system, such as over a "cloud" 728 in a platform 730. The cloud 728 includes and/or is representative of the platform 730 for services 732 and/or resources 734. For example, the services 732 may include the data service 602 as described with reference to FIG. 6. Additionally, the resources 734 may include the patch search application 104 and/or the composition application 110 that are implemented at the data service as described with reference to FIG. 6.

The platform 730 abstracts underlying functionality of hardware, such as server devices (e.g., included in the services 732) and/or software resources (e.g., included as the resources 734), and connects the example device 702 with other devices, servers, etc. The resources 734 may also include applications and/or data that can be utilized while computer processing is executed on servers that are remote from the example device 702. Additionally, the services 732 and/or the resources 734 may facilitate subscriber network services, such as over the Internet, a cellular network, or Wi-Fi network. The platform 730 may also serve to abstract and scale resources to service a demand for the resources 734 that are implemented via the platform, such as in an interconnected device embodiment with functionality distributed throughout the system 700. For example, the functionality may be implemented in part at the example device 702 as well as via the platform 730 that abstracts the functionality of the cloud 728.

Although embodiments of fast dense patch search and quantization have been described in language specific to features and/or methods, the appended claims are not necessarily limited to the specific features or methods described. Rather, the specific features and methods are disclosed as example implementations of fast dense patch search and quantization.

The invention claimed is:

1. A fast dense patch search method, comprising:
   obtaining by a computing device and from storage example image patches that are taken from example images;
   determining, from partitions of the example image patches and by the computing device, partition center patches for the partitions of example image patches, the example image patches in a partition being similar, one example image patch to another, a partition center patch determined to represent the example image patches of the partition;
   obtaining by the computing device an input digital image;
   forming patch groups by the computing device that each include similar image patches of the input digital image and a reference image patch that represents the similar image patches in a respective patch group;
   determining which of the partition center patches of the partitions of the example image patches by the computing device is a nearest neighbor to the reference image patch of a patch group;
   allocating the determined partition center patch by the computing device as the nearest neighbor to the similar image patches of the input digital image in the patch group; and
   outputting the allocated patch.

2. The method as recited in claim 1, wherein said determining which of the partition center patches is the nearest neighbor to the reference image patch is based on a single-nearest neighbor (1-NN) distance determination.

3. The method as recited in claim 1, wherein said determining the partition center patches for the partitions of the example image patches includes one of:
   each of the example image patches represents one of the partitions and is the partition center patch for its respective partition; or
   the partitions are clusters of example image patches and the partition center patch of a respective partition is an average of the example image patches in the partition.

4. The method as recited in claim 1, wherein said forming the patch groups of the similar image patches of the input digital image comprises:
   sampling image patches of the input digital image;
   determining the similar image patches of the input digital image based on computed distances between the image patches of the input digital image; and
   grouping the similar image patches of the input digital image into one of the patch groups based on the computed distances between the similar image patches of the input digital images being less than a distance threshold.

5. The method as recited in claim 1, further comprising randomly selecting the reference image patch for a patch group from the similar image patches of the input digital image in each of the respective patch groups.

6. The method as recited in claim 1, wherein said allocating the determined partition center patch as the nearest neighbor to the similar image patches of the input digital image in the patch group comprises:
   scanning image patches of the input digital image in a raster scanning order; and
   for each reference image patch and corresponding determined partition center patch, assigning an index of the determined partition center patch to each of the similar image patches of the input digital image in the patch group represented by the reference image patch.

7. A computing device for performing a fast dense patch search, the computing device comprising:
   one or more processors; and
   a memory comprising computer-readable instructions that are executable by the one or more processors to implement a fast dense patch search application to perform operations comprising:
   causing an input digital image to be maintained in the memory, the input digital image including patch groups of similar image patches and a reference image patch that represents the similar image patches of the input digital image in a respective patch group;
   obtaining from a database example image patches that are taken from example images;
   determining, from partitions of the example image patches, partition center patches for the partitions of example image patches, the example image patches in a partition being similar, one example image patch to another, a partition center patch determined to represent the example image patches of the partition;
   determining which of a partition center patches of the partitions of the example image patches is a nearest neighbor to the reference image patch of a patch group, the partition center patch included in a group of nearby partition center patches;
   ascertaining, from the nearby partition center patches, the nearest neighbor to each of the similar image patches of the input digital image in the patch group; and
   outputting the ascertained patches.

8. The computing device as recited in claim 7, wherein:
   determining which of the partition center patches is the nearest neighbor to the reference image patch is based on a single-nearest neighbor (1-NN) distance determination; and
   ascertaining, from the nearby partition center patches, the nearest neighbor to each of the similar image patches of the input digital image in the patch group is based on a k-nearest neighbor (k-NN) distance determination.

9. The computing device as recited in claim 7, wherein the operations further comprise ascertaining the group of the nearby partition center patches as the nearest neighbors to the reference image patch of the patch group based on a k-nearest neighbor (k-NN) distance determination.

10. The computing device as recited in claim 7, wherein the operations further comprise determining the partition center patches for the partitions of the example image patches based on one of:
    each of the example image patches represents one of the partitions and is the partition center patch for its respective partition; or the partitions are clusters of example image patches and the partition center patch of a respective partition is an average of the example image patches in the partition.

11. The computing device as recited in claim 7, wherein the operations further comprise forming the patch groups that each include the similar image patches of the input digital image and the reference image patch that represents the similar image patches in a respective patch group.

12. The computing device as recited in claim 11, wherein forming the patch groups of the similar image patches of the input digital image includes:
sampling image patches of the input digital image;
determining the similar image patches of the input digital image based on computed distances between the image patches of the input digital image;
grouping the similar image patches of the input digital image into one of the patch groups based on the computed distances between the similar image patches of the input digital image being less than a distance threshold; and
randomly selecting the reference image patch for a patch group from the similar image patches of the input digital image in each of the respective patch groups.

13. The computing device as recited in claim 7, wherein the operations further comprise:
scanning the image patches of the input digital image in a raster scanning order; and
for each reference image patch and corresponding determined partition center patch, assigning an index of the determined partition center patch to each of the similar image patches of the input digital image in the patch group represented by the reference image patch.

14. A fast dense patch search method, comprising:
obtaining by a computing device and from storage example image patches that are taken from example images;
determining, from partitions of the example image patches and by the computing device, partition center patches for the partitions of example image patches, the example image patches in a partition being similar one example image patch to another, a partition center patch determined to represent the example image patches of the partition;
obtaining by the computing device an input digital image;
forming patch groups by the computing device that each include similar image patches of the input digital image and a reference image patch that represents the similar image patches in a respective patch group;
determining which of the partition center patches of the partitions of the example image patches by the computing device is a nearest neighbor to the reference image patch of a patch group, the partition center patch included in a group of nearby partition center patches;
ascertaining, from the nearby partition center patches and by the computing device, the nearest neighbor to each of the similar image patches of the input digital image in the patch group; and
outputting the ascertained patches.

15. The method as recited in claim 14, wherein:
said determining which of the partition center patches is the nearest neighbor to the reference image patch is based on a single-nearest neighbor (1-NN) distance determination; and
said ascertaining, from the nearby partition center patches, the nearest neighbor to each of the similar image patches of the input digital image in the patch group is based on a k-nearest neighbor (k-NN) distance determination.

16. The method as recited in claim 14, further comprising:
ascertaining the group of the nearby partition center patches as the nearest neighbors to the reference image patch of the patch group based on a k-nearest neighbor (k-NN) distance determination.

17. The method as recited in claim 14, wherein said determining which of the partition center patches is the nearest neighbor includes one of:
each of the example image patches represents one of the partitions and is the partition center patch for its respective partition; or
the partitions are clusters of example image patches and the partition center patch of a respective partition is an average of the example image patches in the partition.

18. The method as recited in claim 14, wherein said forming the patch groups of the similar image patches in the image comprises:
sampling image patches of the input digital image;
determining the similar image patches of the input digital image based on computed distances between the image patches of the input digital image; and
grouping the similar image patches of the input digital image into one of the patch groups based on the computed distances between the similar image patches of the input digital image being less than a distance threshold.

19. The method as recited in claim 14, further comprising randomly selecting the reference image patch for a patch group from the similar image patches of the input digital image in each of the respective patch groups.

20. The method as recited in claim 14, wherein said forming the patch groups of the similar image patches of the input digital image comprises:
scanning image patches of the input digital image in a raster scanning order; and
for each reference image patch and corresponding determined partition center patch, assigning an index of the determined partition center patch to each of the similar image patches of the input digital image in the patch group represented by the reference image patch.

* * * * *

UNITED STATES PATENT AND TRADEMARK OFFICE
CERTIFICATE OF CORRECTION

PATENT NO.         : 9,286,540 B2
APPLICATION NO.    : 14/085488
DATED              : March 15, 2016
INVENTOR(S)        : Zhe Lin et al.

It is certified that error appears in the above-identified patent and that said Letters Patent is hereby corrected as shown below:

In the claims

Column 14, line 38, after "determining which of", delete "a", insert --the--, therefor.

Signed and Sealed this
Fourteenth Day of June, 2016

Michelle K. Lee
*Director of the United States Patent and Trademark Office*